US007913548B2

(12) United States Patent
Ono

(10) Patent No.: US 7,913,548 B2
(45) Date of Patent: Mar. 29, 2011

(54) DETERMINATION OF ENGINE ROTATIONAL SPEED BASED ON CHANGE IN CURRENT SUPPLIED TO ENGINE STARTER

(75) Inventor: Hiroaki Ono, Tokoname (JP)

(73) Assignee: Denso Corporation, Kariya (JP)

( * ) Notice: Subject to any disclaimer, the term of this patent is extended or adjusted under 35 U.S.C. 154(b) by 154 days.

(21) Appl. No.: 12/354,893

(22) Filed: Jan. 16, 2009

(65) Prior Publication Data

US 2009/0183557 A1 Jul. 23, 2009

(30) Foreign Application Priority Data

Jan. 21, 2008 (JP) ................................ 2008-010386

(51) Int. Cl.
*G01M 15/04* (2006.01)

(52) U.S. Cl. .................................................... 73/114.25

(58) Field of Classification Search ............... 73/114.25, 73/114.58, 114.59

See application file for complete search history.

(56) References Cited

U.S. PATENT DOCUMENTS

| | | | | |
|---|---|---|---|---|
| 3,968,425 | A * | 7/1976 | Hanson et al. | 324/392 |
| 4,731,601 | A * | 3/1988 | Nowakowski et al. | 340/439 |
| 5,585,717 | A * | 12/1996 | Eriksson et al. | 324/166 |
| 6,438,487 | B1 * | 8/2002 | Mingo et al. | 701/113 |
| 6,553,816 | B1 * | 4/2003 | Palanisamy et al. | 73/114.59 |
| 6,707,169 | B2 * | 3/2004 | Shimizu et al. | 290/40 C |
| 6,840,203 | B2 * | 1/2005 | Wakitani et al. | 123/179.3 |
| 7,105,944 | B2 * | 9/2006 | Wakitani et al. | 307/10.6 |
| 7,743,649 | B1 * | 6/2010 | Salman et al. | 73/114.59 |
| 2004/0123587 | A1 * | 7/2004 | Kamiya et al. | 60/284 |
| 2005/0182536 | A1 * | 8/2005 | Doyle et al. | 701/29 |
| 2009/0309530 | A1 * | 12/2009 | Shin | 318/490 |
| 2010/0064786 | A1 * | 3/2010 | Ge et al. | 73/114.25 |

FOREIGN PATENT DOCUMENTS

| | | |
|---|---|---|
| EP | 1 591 657 | 11/2005 |
| JP | 2001-098986 | 4/2001 |
| JP | 2005-315202 | 11/2005 |
| JP | 2007-083965 | 4/2007 |

* cited by examiner

*Primary Examiner* — Freddie Kirkland, III
(74) *Attorney, Agent, or Firm* — Nixon & Vanderhye P.C.

(57) ABSTRACT

An engine rotational speed determining device is disclosed which includes a signal inputting means and a rotational speed determining means. The signal inputting means inputs a signal that indicates current supplied to an electric motor, which starts an internal combustion engine, during a starting operation of the engine by the motor. The rotational speed determining means determines a rotational speed of the engine in the starting operation based on a change in the current indicated by the signal input by the signal inputting means.

16 Claims, 11 Drawing Sheets

FIG.11
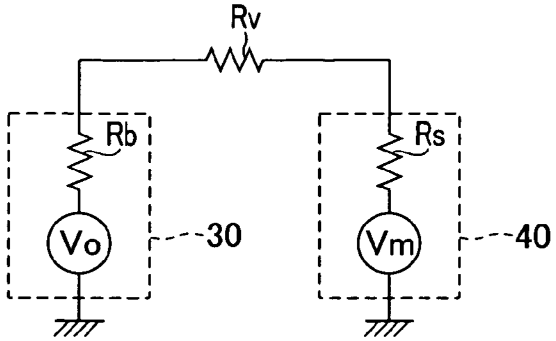
FIG.12A
| TEMP. | LOW ←——→ HIGH |
|---|---|
| Rv+Rs | |
FIG.12B
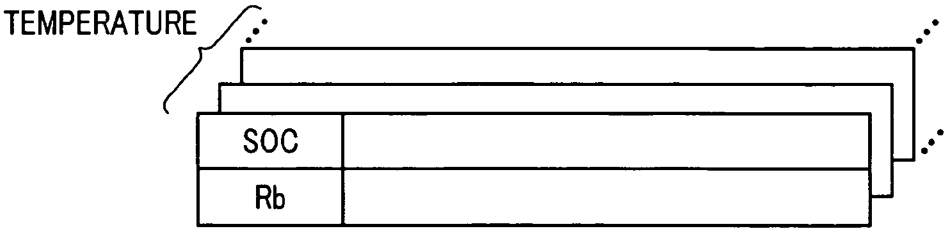
FIG.13
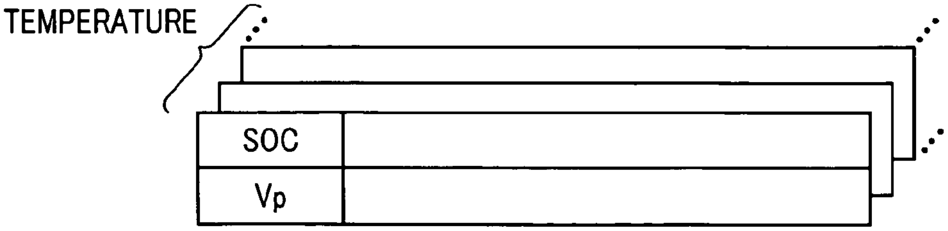

DETERMINATION OF ENGINE ROTATIONAL SPEED BASED ON CHANGE IN CURRENT SUPPLIED TO ENGINE STARTER

CROSS-REFERENCE TO RELATED APPLICATION

This application is based on and claims priority from Japanese Patent Application No. 2008-10386, filed on Jan. 21, 2008, the content of which is hereby incorporated by reference in its entirety into this application.

BACKGROUND OF THE INVENTION

1. Technical Field of the Invention

The present invention relates generally to engine rotational speed determining devices, engine starting possibility predicting devices, engine friction estimating devices, and engine automatic stop control devices. More particularly, the invention relates to an engine rotational speed determining device, an engine starting possibility predicting device, an engine friction estimating device, and an engine automatic stop control device, which perform the respective functions, for an internal combustion engine that is started by an electric motor, based on a change in current supplied to the motor.

2. Description of the Related Art

Japanese Patent First Publication No. 2007-83965 discloses a device that determines, during a starting operation of an internal combustion engine by a starter, the rotational speed of the engine based on a change in the terminal voltage of a battery that powers the starter.

More specifically, in the vicinities of compression top dead centers of the engine, forces counteracting the rotation of a crankshaft of the engine with the starter are increased, thus decreasing the rotational speed of the engine; further, the discharge current of the battery is increased, thus decreasing the terminal voltage of the battery. Therefore, the rotational speed of the engine can be determined based on the fact that the cycle of change in the terminal voltage of the battery corresponds to the time required for an angular change of (720°/Nc) for the crankshaft, where Nc is the number of cylinders of the engine.

However, the internal resistance of the battery depends largely on both the State of Charge (SOC) of the battery and the deterioration degree of the battery. More specifically, the internal resistance of the battery is increased with decrease in the SOC of the battery; it is also increased with increase in the deterioration degree of the battery. Accordingly, the change in the terminal voltage of the battery during the starting operation of the engine also depends largely on both the SOC and deterioration degree of the battery.

Consequently, it may be difficult for the device to accurately detect the rotational speed of the engine based on the change in the terminal voltage of the battery during the starting operation of the engine.

SUMMARY OF THE INVENTION

According to a first aspect of the present invention, there is provided an engine rotational speed determining device which includes a signal inputting means and a rotational speed determining means. The signal inputting means inputs a signal that indicates current supplied to an electric motor, which starts an internal combustion engine, during a starting operation of the engine by the motor. The rotational speed determining means determines a rotational speed of the engine in the starting operation based on a change in the current indicated by the signal input by the signal inputting means.

According to a further implementation of the invention, the engine rotational speed determining device further includes a relaxation process performing means and a relaxation process resetting means. The relaxation process performing means performs a relaxation process for the signal input by the inputting means to eliminate the influence of electrical noise included in the signal. The relaxation process resetting means resets the relaxation process at a timing when the current indicated by the signal has decreased, after an initial rapid increase thereof, to become not higher than a predetermined threshold. The rotational speed determining means determines the rotational speed of the engine based on the signal that has received the relaxation process which is performed by the relaxation process performing means and reset by the relaxation process resetting means.

According to a second aspect of the present invention, there is provided an engine starting possibility predicting device which includes a signal inputting means, a rotational speed determining means, a torque determining means, and a possibility predicting means. The signal inputting means inputs a signal that indicates current supplied to an electric motor, which starts an internal combustion engine, during each of a plurality of starting operations of the engine by the motor. The rotational speed determining means determines a rotational speed of the engine in each of the starting operations based on a change in the current indicated by the signal input by the signal inputting means. The torque determining means determines a torque of the motor in each of the starting operations based on the change in the current indicated by the signal input by the signal inputting means. The possibility predicting means predicts, based on the rotational speeds of the engine and the torques of the motor determined by the rotational speed determining means and the torque determining means, a possibility of the motor to successfully start the engine in an upcoming starting operation of the engine.

According to a further implementation of the invention, the engine starting possibility predicting device further includes a rotational speed predicting means. The rotational speed predicting means predicts a rotational speed of the engine in the upcoming starting operation based on the rotational speeds of the engine and the torques of the motor determined by the rotational speed determining means and the torque determining means. When the rotational speed of the engine in the upcoming starting operation predicated by the rotational speed predicting means is greater than or equal to a predetermined value, the possibility predicting means predicts that it is possible for the motor to successfully start the engine in the upcoming starting operation.

Furthermore, the motor is powered by a battery. The rotational speed predicting means predicts the rotational speed of the engine in the upcoming starting operation in the following way: 1) defining a two-dimensional coordinate plane, where one coordinate axis indicates rotational speed of the engine and the other coordinate axis indicates torque of the motor; 2) determining, on the two-dimensional coordinate plane, a friction curve based on the rotational speeds of the engine and the torques of the motor determined by the rotational speed determining means and the torque determining means, the friction curve representing friction of the engine; 3) determining, on the two-dimensional coordinate plane, a performance curve of the motor based on a State of Charge (SOC) of the battery, the performance curve representing the performance of the motor at the SOC of the battery; and 4) predicting the rotational speed of the engine in the upcoming starting operation as the rotational speed of the engine at an intersection point between the friction curve and the performance curve of the motor.

According to a third aspect of the present invention, there is provided an engine friction estimating device which includes a signal inputting means, a rotational speed determining means, a torque determining means, and an engine friction estimating means. The signal inputting means inputs a signal that indicates current supplied to an electric motor, which starts an internal combustion engine, during each of a plurality of starting operations of the engine by the motor. The rotational speed determining means determines a rotational speed of the engine in each of the starting operations based on a change in the current indicated by the signal input by the signal inputting means. The torque determining means determines a torque of the motor in each of the starting operations based on the change in the current indicated by the signal input by the signal inputting means. The engine friction estimating means estimates friction of the engine based on the rotational speeds of the engine and the torques of the motor determined by the rotational speed determining means and the torque determining means.

According to a further implementation of the invention, the engine friction estimating means estimates the friction of the engine in the form of an estimated value of the friction.

Furthermore, the engine friction estimating means determines the estimated value of the friction in the following way: 1) defining a two-dimensional coordinate plane, where one coordinate axis indicates rotational speed of the engine and the other coordinate axis indicates torque of the motor; 2) determining, on the two-dimensional coordinate plane, a friction curve based on the rotational speeds of the engine and the torques of the motor determined by the rotational speed determining means and the torque determining means, the friction curve representing the friction of the engine; and 3) determining the estimated value of the friction as the torque of the motor at the point on the friction curve where the rotational speed of the engine is equal to a predetermined value.

According to a fourth aspect of the present invention, there is provided an engine automatic stop control device which includes a signal inputting means, a rotational speed determining means, a torque determining means, an engine friction estimating means, and a controlling means. The signal inputting means inputs a signal that indicates current supplied to an electric motor, which starts an internal combustion engine, during each of a plurality of starting operations of the engine by the motor. The rotational speed determining means determines a rotational speed of the engine in each of the starting operations based on a change in the current indicated by the signal input by the signal inputting means. The torque determining means determines a torque of the motor in each of the starting operations based on the change in the current indicated by the signal input by the signal inputting means. The engine friction estimating means estimates friction of the engine based on the rotational speeds of the engine and the torques of the motor determined by the rotational speed determining means and the torque determining means. The controlling means controls an automatic stop of the engine based on the friction of the engine estimated by the engine friction estimating means.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIG. 11 is a circuit diagram showing an equivalent circuit between the battery and the starter;

FIG. 12A is a map used by the battery ECU to determine a parameter (Rv+Rs) in the equivalent circuit;

FIG. 12B is a map used by the battery ECU to determine a parameter Rb in the equivalent circuit;

FIG. 13 is a map used by the battery ECU to determine the polarization voltage of the battery;

DESCRIPTION OF PREFERRED EMBODIMENTS

Figure 1:
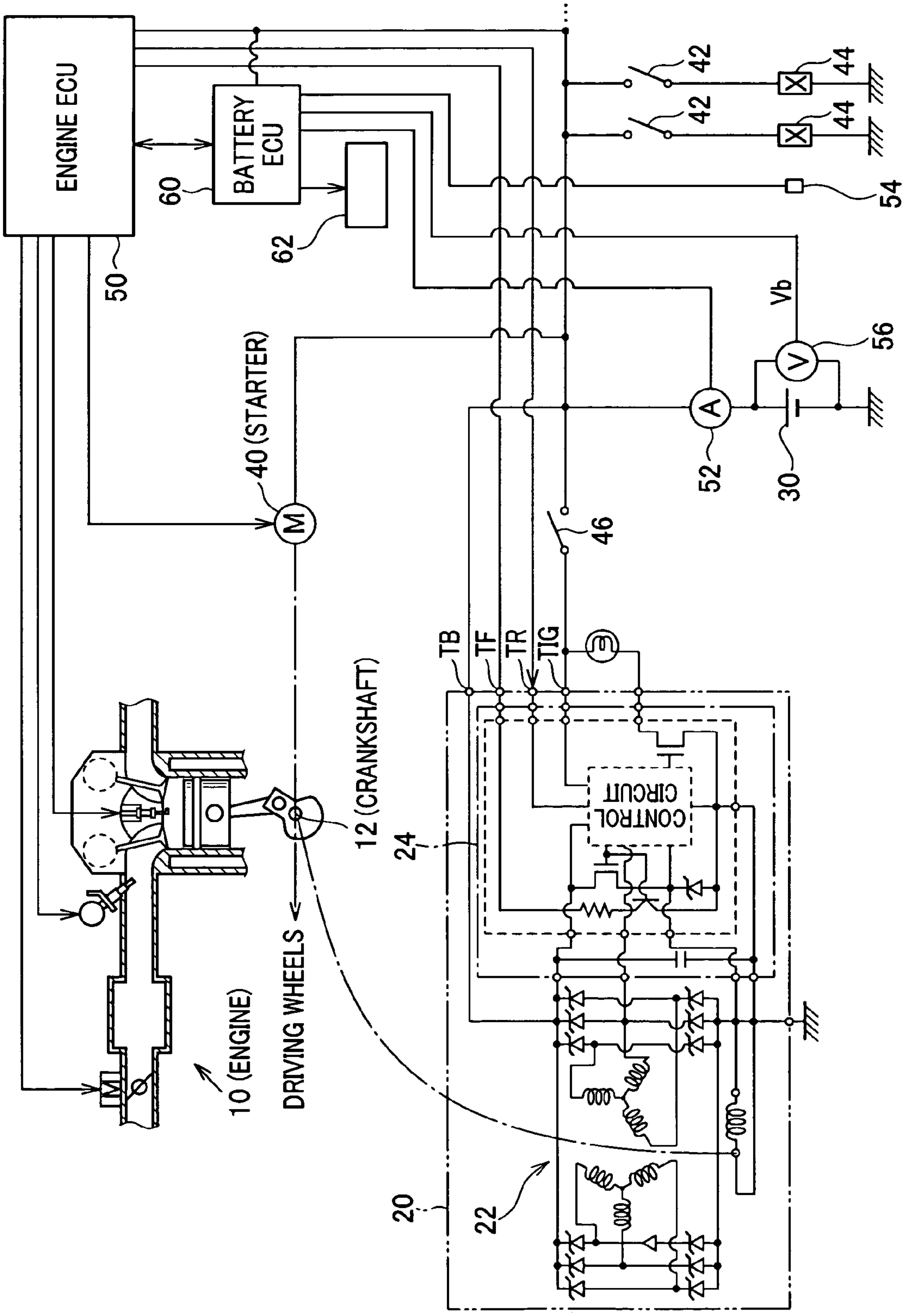
FIG. 1 is a schematic view showing the overall configuration of a power system for a motor vehicle according to the first embodiment of the invention.

Preferred embodiments of the present invention will be described hereinafter with reference to FIGS. 1-16.

It should be noted that, for the sake of clarity and understanding, identical components having identical functions in different embodiments of the invention have been marked, where possible, with the same reference numerals in each of the figures.

First Embodiment

FIG. 1 shows the overall configuration of a power system for a motor vehicle according to the first embodiment of the invention.

The power system includes a port-injection gasoline engine 10 as a mechanical power generation unit. The engine 10 includes a crankshaft 12 that is mechanically connected to the driving wheels (not shown) of the vehicle.

The power system also includes an electric power generation unit 20 which includes an automotive alternator 22 for generating electric power and a voltage regulator 24 for regulating the output voltage of the alternator 22. The alternator 22 includes a rotor (not shown) that is mechanically connected to the crankshaft 12 of the engine 10, so that the alternator 22 can be driven by the engine 10.

The electric power generation unit 20 includes a battery terminal TB, to which is electrically connected a battery 30. In the present embodiment, the battery 30 is made up of a lead accumulator.

Electric loads 44 are connected to the battery 30 via corresponding switches 42. Further, in parallel with the electric loads 44, a starter 40 is electrically connected to the battery 30. The starter 40 is an electric motor for starting the engine 10. More specifically, the starter 40 functions to impart initial rotation to the crankshaft 12 of the engine 10.

The electric power generation unit 20 also includes an ignition terminal TIG which is electrically connected, via an ignition switch 46, to a power supply line extending between the battery terminal TB and the battery 30.

There also are provided in the power system an engine ECU (Electronic Control Unit) 50 and a battery ECU 60, both of which are configured with, for example, a microcomputer and powered by the battery 30.

The battery ECU 60 monitors the state of the battery 30 based on signals output from a current sensor 52, a temperature sensor 54, and a voltage sensor 56. The current sensor 52 senses the current charged into or discharged from the battery 30 and outputs the signal which indicates the sensed current. The temperature sensor 54 senses the temperature of the battery 30 and outputs the signal which indicates the sensed temperature. The voltage sensor 56 senses the terminal voltage of the battery 30 and indicates the signal which represents the sensed terminal voltage.

In particular, the battery ECU 60 determines the State of Charge (SOC) of the battery 30 through a cumulative computation of the charge/discharge current of the battery 30. The SOC is a parameter representative of the discharge capability of the battery 30. More specifically, the SOC represents the ratio of the amount of electricity currently stored in the battery 30 to the full capacity of the battery 30 for storing electricity. The SOC can be quantified by, for example, 5-hour rate capacity or 10-hour rate capacity.

In addition, the open-circuit voltage of the battery 30, which represents the terminal voltage of the battery 30 when there is no external load connected to the terminals of the battery 30, depends on the SOC of the battery 30. More specifically, the open-circuit voltage of the battery 30 increases with the SOC of the battery 30. For example, the open-circuit voltage of the battery 30 is 11.8 V when the SOC is 0%, but is 12.8 V when the SOC is 100%.

The engine ECU 50 controls operations of the engine 10 and the electric power generation unit 20.

In particular, the engine ECU 50 controls, based on information about the SOC of the battery 30 output from the battery ECU 60, the output voltage of the electric power generation unit 20 (i.e., the voltage at the battery terminal TB of the electric power generation unit 20). More specifically, the engine ECU 50 outputs a command value of the output voltage to a command terminal TR of the electric power generation unit 20. Then, the voltage regulator 24 regulates the output voltage of the electric power generation unit 20 to the inputted command value. Moreover, the engine ECU 50 inputs, from a monitor terminal TF of the electric power generation unit 20, a power generation state signal that indicates the state of power generation by the electric power generation unit 20. Here, the state of power generation by the electric power generation unit 20 can be represented by the duty ratio of a switching element (not shown) included in the regulator 24. The engine ECU 50 controls the output voltage of the electric power generation unit 20 so as to minimize the fuel consumption of the engine 10 due to the power generation while keeping the SOC of the battery 30 within an allowable range.

The engine ECU 50 also performs an engine automatic stop control (or idle reduction control) and an engine automatic start control. The engine automatic stop control is performed to automatically stop the engine 10 when the engine 10 is not being used to move the vehicle. The engine automatic start control is performed to automatically start, by means of the starter 40, the engine 10 from a stop to move the vehicle.

To successfully start the engine 10, it is necessary for the rotational speed of the crankshaft 12 to be raised by the starter 40 above a lower limit. Accordingly, the starter 40 is generally designed to be capable of generating enough torque to raise the rotational speed of the crankshaft 12 above the lower limit. However, friction of the engine 10, which counteracts the rotation of the crankshaft 12 with the starter 40, changes with the aging deterioration of the engine 10. Thus, when the friction of the engine 10 has changed to exceed a value estimated in the design of the starter 40, it may become impossible for the starter 40 to raise the rotational speed of the engine 10 above the lower limit.

Therefore, in the present embodiment, during each of starting operations of the engine 10, the battery ECU 60 determines both the rotational speed of the engine 10 and the torque of the starter 40 based on the current supplied to the starter 40. Then, based on the determined rotational speeds and torques, the battery ECU 60 estimates the friction of the engine 10. Further, based on the estimated friction of the engine 10, the battery ECU 60 estimates whether it is possible for the starter 40 to raise the rotational speed of the engine 10 above the lower limit in an upcoming starting operation of the engine 10.

More specifically, when energization of the starter 40 has just started, the starter 40 does not rotate and thus there is no back electromotive force induced in the starter 40. Therefore, current, the amount of which corresponds to the quotient of the terminal voltage of the battery 30 divided by the resistance between the battery 30 and the starter 40, is supplied to the starter 40, causing the starter 40 to rotate. Further, with the rotation of the starter 40, there is induced in the starter 40 a back electromotive force which reduces the current flowing through the starter 40. Therefore, the current flowing through the starter 40 depends on the rotational speed of the starter 40.

Moreover, during a time period from the start of energization of the starter 40 to the start of combustion control of the engine 10, the starter 40 rotates, together with the crankshaft 12, at a speed that depends on both the torque generated by the starter 40 and a load torque imposed on the crankshaft 12. Therefore, the current flowing through the starter 40 also depends on the load torque imposed on the crankshaft 12.

Furthermore, the load torque imposed on the crankshaft 12 cyclically changes with the reciprocating movements of pistons in cylinders of the engine 10; thus, the rotational speed of the starter 40 also cyclically changes with the reciprocating movements of the pistons. The cyclic change in the rotational speed of the starter 40 causes a cyclic change in the current flowing through the starter 40.

Therefore, based on the cyclic change in the current flowing through the starter 40, it is possible to determine the rotational speed of the starter 40. Further, the rotational speed of the crankshaft 12 can be computed by multiplying the rotational speed of the starter 40 by a gear ratio between the starter 40 and the crankshaft 12.

In the present embodiment, there is provided no dedicated current sensor for sensing the current flowing through the starter 40. Therefore, the battery ECU 60 determines the rotational speed of the starter 40 based on the discharge current of the battery 30 instead of the current flowing through the starter 40.

Figure 2A:
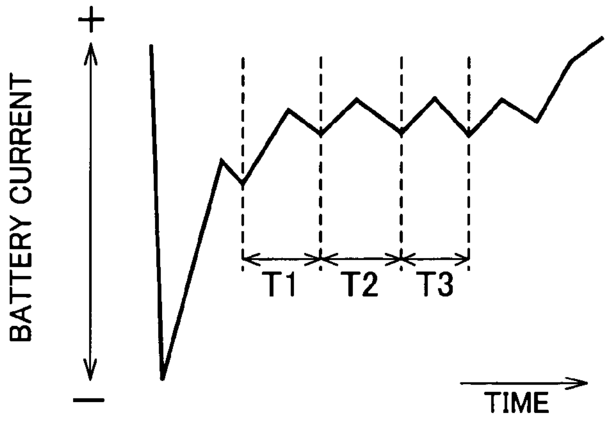
FIG. 2A is a time chart illustrating the change in the discharge current of a battery during a starting operation of an engine in the power system of FIG. 1.

FIG. 2A shows the change in the discharge current of the battery 30 during a starting operation of the engine 10. In FIG. 2A, the positive (+) direction represents the direction of current being charged into the battery 30, whereas the negative (−) direction represents the direction of current being discharged from the battery 30. Therefore, the greater the current is in the negative direction, the more current is discharged from the battery 30.

As shown in FIG. 2A, the discharge current of the battery 30 once increases rapidly, and then decreases. After that, the discharge current repeats increasing and decreasing cyclically. Therefore, it is possible to compute the rotational speed of the starter 40 based on either a time interval between two adjacent local maximum values or on a time interval between two adjacent local minimum values of the discharge current of the battery 30.

For example, in FIG. 2A, there are shown three time intervals T1, T2, and T3, each of which is between two adjacent local maximum values of the discharge current of the battery 30. The values of the rotational speed of the starter 40 for those time intervals can be respectively computed as (720/(Nc×T1)), (720/(Nc×T2)), and (720/(Nc×T3)), where Nc is the number of cylinders of the engine 10. Further, the values of the rotational speed of the crankshaft 12 for the time intervals T1, T2, and T3 can be respectively computed by multiplying the values of the rotational speed of the starter 40 for those time intervals by the gear ratio between the starter 40 and the crankshaft 12.

Figure 2B:
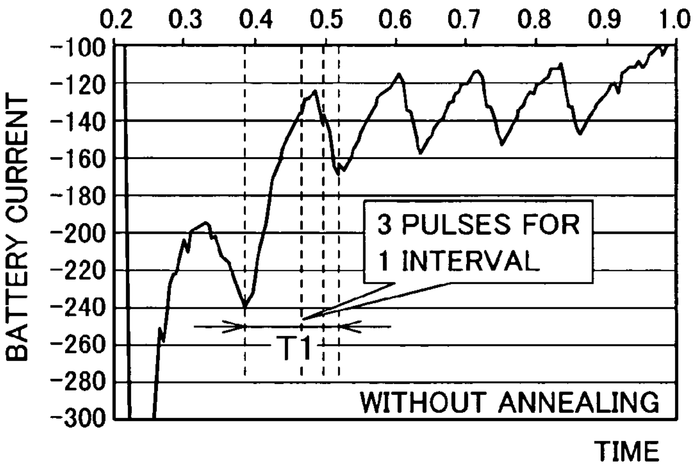
FIG. 2B is a time chart illustrating the waveform of a signal output from a current sensor for sensing the discharge current of the battery.

However, the discharge current of the battery 30 sensed by the current sensor 52 behaves as shown in FIG. 2B. This is because the signal output from the current sensor 52 includes electrical noise and thus cannot correctly reflect the actual change in the discharge current of the battery 30. For example, for the first time interval T1, there are three pulses in the waveform of the signal output from the current sensor 52. Accordingly, it is difficult for the battery ECU 60 to accurately determine the rotational speed of the starter 40 based directly on the waveform of the signal output from the current sensor 52.

Therefore, in the present embodiment, the battery ECU 60 first performs an annealing process (or a relaxation process) for the signal output from the current sensor 52.

Figure 2C:
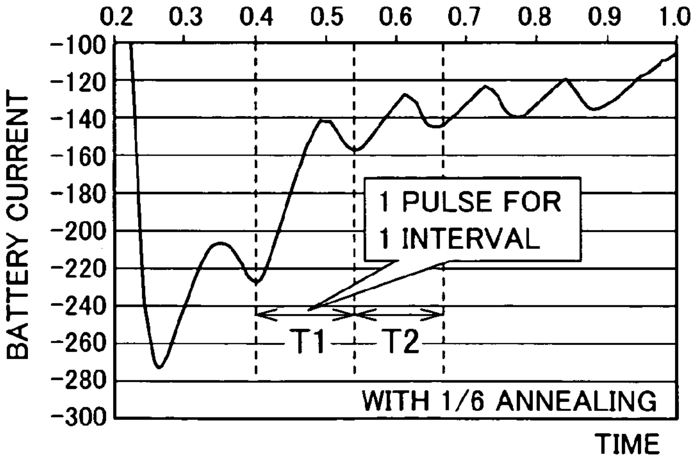
FIG. 2C is a time chart illustrating a waveform obtained by performing an annealing process for the signal output from the current sensor.

For example, the battery ECU 60 may perform a "⅙ annealing process" for the signal output from the current sensor 52, obtaining a waveform of the signal as shown in FIG. 2C. Here, the ⅙ annealing process denotes a weighted average process which computes a current value of the discharge current by adding the product of multiplying a previously-sensed value of the discharge current by ⅚ to the product of multiplying a currently-sensed value of the discharge current by ⅙. It can be seen from FIG. 2C that after the annealing process, the influence of the electrical noise is completely eliminated and thus there is only one pulse for each time interval in the waveform. Accordingly, it is possible for the battery ECU 60 to accurately determine the rotational speed of the starter 40 based on the waveform obtained by the annealing process.

Moreover, if the battery ECU 60 starts the above annealing process at the same timing as the start of energization of the starter 40, the initial rapid increase in the discharge current of the battery 30, which occurs before the start of rotation of the starter 40, will influence the results of the annealing process. Consequently, the timings of occurrence of the local maximum values of the discharge current which are determined based on the waveform obtained by the annealing process will deviate from the timings at which the local maximum values actually occur. As a result, the accuracy of the determination of the rotational speed of the starter 40 may be lowered.

Therefore, in the present embodiment, the battery ECU 60 further resets the annealing process at a timing when the once rapidly-increased discharge current of the battery 30 comes to decrease, thereby eliminating the influence of the initial rapid increase in the discharge current on the results of the annealing process.

Figure 3:
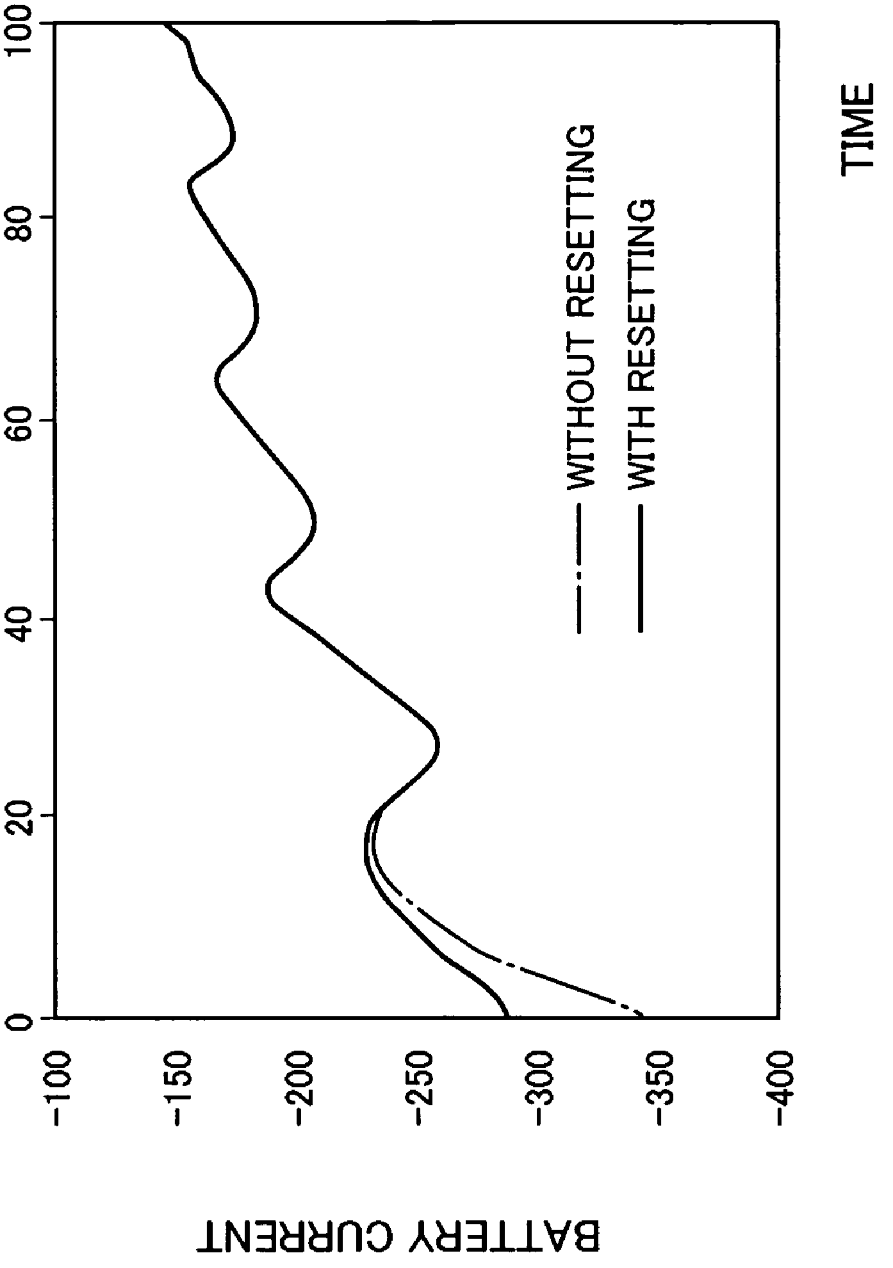
FIG. 3 is a time chart illustrating the effect of resetting the annealing process.

FIG. 3 illustrates the effect of resetting the annealing process. In FIG. 3, the solid line indicates the waveform obtained by resetting the annealing process at a timing when the discharge current of the battery 30 decreases to −300 A, whereas the chain line indicates the waveform obtained without resetting the annealing process. It can be seen from FIG. 3 that the waveform obtained without resting the annealing process lags behind the waveform obtained by resetting the annealing process due to the influence of the initial rapid increase in the discharge current.

Resetting the annealing process is effective especially when the rotational speed of the starter 40 is determined based on the change in the discharge current of the battery 30 as in the present embodiment. In comparison, in the case of determining the rotational speed of the starter 40 based on the change in the terminal voltage of the battery 30 as disclosed in Japanese Patent First Publication No. 2007-83965, it is difficult to reset an annealing process for the signal output from the voltage sensor 56.

Figure 4A:
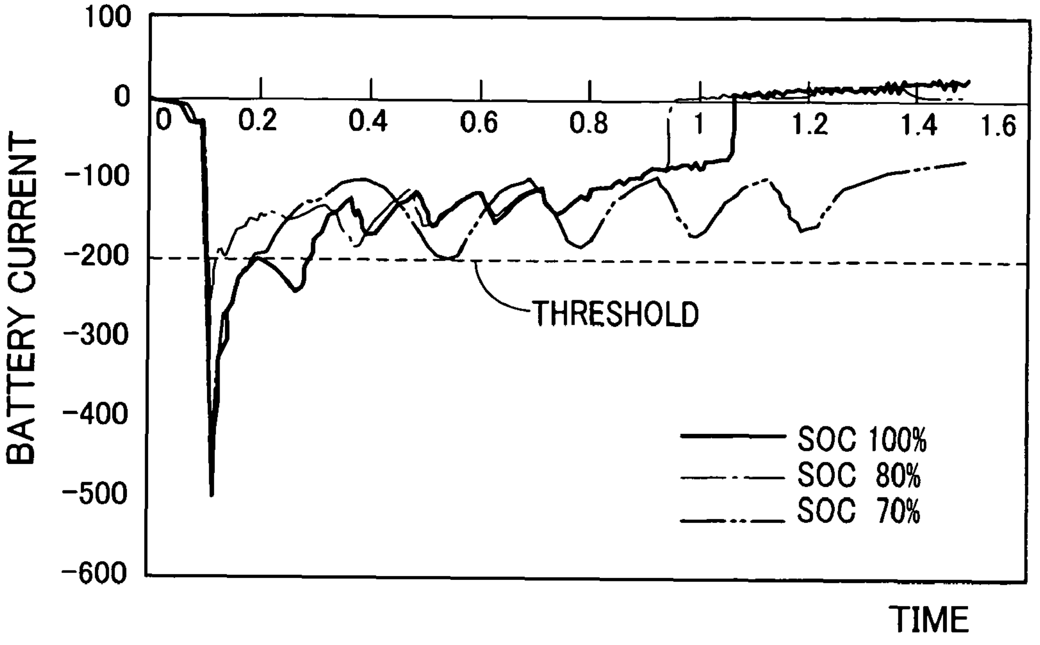
FIG. 4A is a time chart illustrating the influence of the SOC of the battery on the discharge current of the battery.

For example, FIG. 4A illustrates three waveforms of the signal output from the current sensor 52, which are obtained with the SOC of the battery 30 being respectively equal to 100%, 80%, and 70%. It can be seen from FIG. 4A that the discharge current of the battery 30 depends only slightly on the SOC of the battery 30 and it is thus easy to set a common threshold of the discharge current to the three waveforms for determining the timing of resetting the annealing process.

Figure 4B:
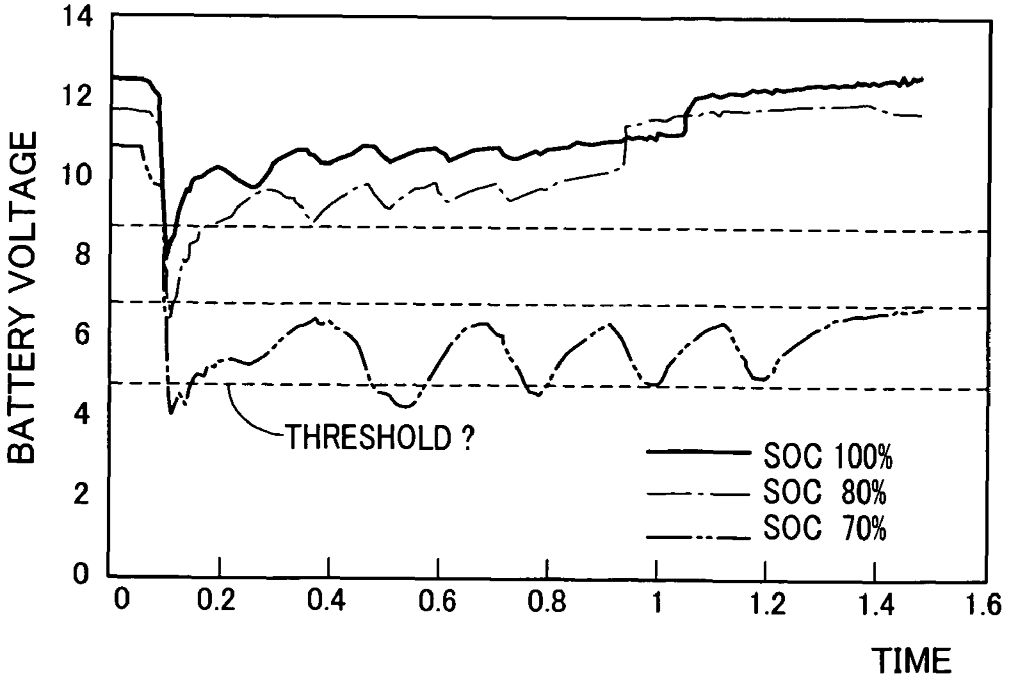
FIG. 4B is a time chart illustrating the influence of the SOC of the battery on the terminal voltage of the battery.

On the other hand, FIG. 4B illustrates three waveforms of the signal output from the voltage sensor 56, which are obtained with the SOC of the battery 30 being respectively equal to 100%, 80%, and 70%. It can be seen from FIG. 4B that the terminal voltage of the battery 30 depends heavily on the SOC of the battery 30 and it is thus difficult to set a common threshold of the terminal voltage to the three waveforms for determining the timing of resetting the annealing process.

Figure 5A:
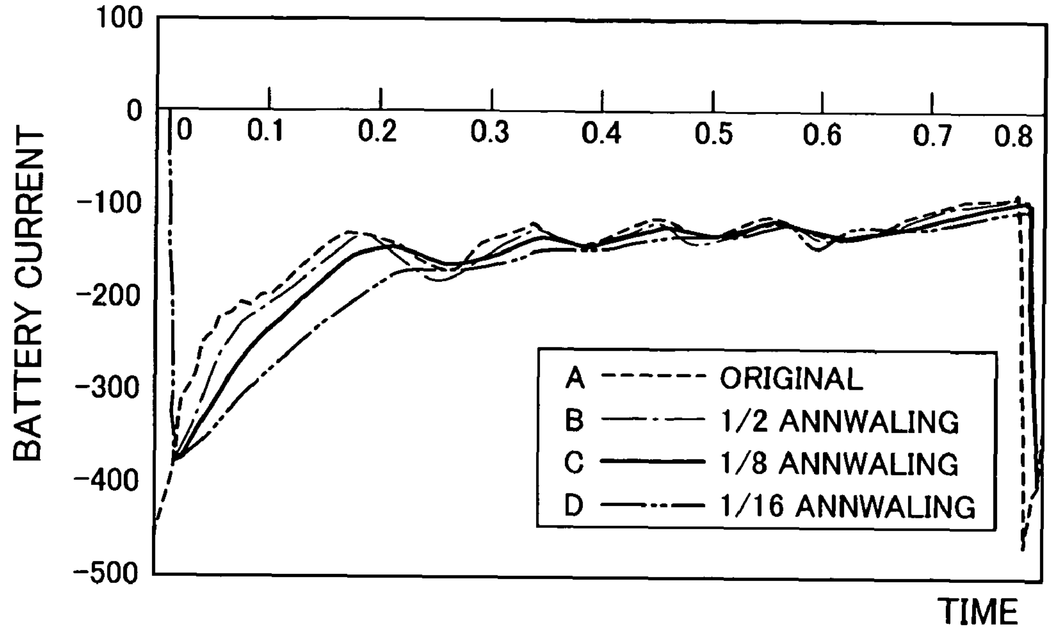
FIG. 5A is a time chart giving a comparison between waveforms that are obtained by performing different annealing processes for the signal output from the current sensor.

FIG. 5A gives a comparison between waveforms that are obtained by performing different annealing processes for the signal output from the current sensor 52. More specifically, in FIG. 5A, the dashed line A represents the waveform of the original signal; the one-dot chain line B represents the waveform obtained by performing a "½ annealing process" for the signal; the solid line C represents the waveform obtained by performing a "⅛ annealing process" for the signal; and the two-dot chain line D represents the waveform obtained by performing a "1/16 annealing process" for the signal. Here, similar to the ⅙ annealing process as described above, the ½, ⅛, and 1/16 annealing processes respectively denote ½, ⅛, and ⅙ weighted average processes.

As seen from FIG. 5A, in the case of performing the ½ annealing process, the degree of relaxation for the change in the sensed discharge current is too small, and it is thus impossible to sufficiently eliminate the influence of the electrical noise. On the other hand, in the case of performing the 1/16 annealing process, the degree of relaxation for the change in the sensed discharge current is too large, and thus the resultant waveform cannot correctly reflect the actual change in the discharge current of the battery 30. Accordingly, in the present embodiment, the ⅛ annealing process is adopted in consideration of the design specifications of the starter 40 and the engine 10.

Figure 5B:
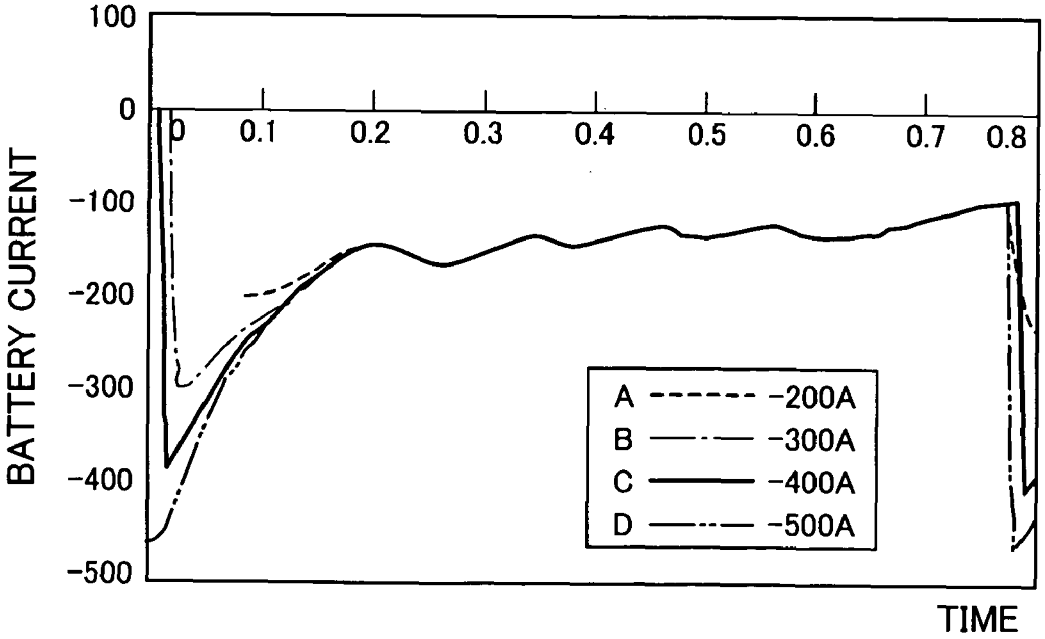
FIG. 5B is a time chart giving a comparison between waveforms that are obtained by resetting the same annealing process with different values of a threshold of the discharge current of the battery.

FIG. 5B gives a comparison between waveforms that are obtained by resetting the annealing process (more specifically, the ⅛ annealing process) with different values of the threshold of the discharge current of the battery 30. More specifically, in FIG. 5B, the dashed line A represents the waveform obtained by resetting the annealing process with the threshold of the discharge current being equal to −200 A; the one-dot chain line B represents the waveform obtained by resetting the annealing process with the threshold being equal to −300 A; the solid line C represents the waveform obtained by resetting the annealing process with the threshold being equal to −400 A; and the two-dot chain line D represents the waveform obtained by resetting the annealing process with the threshold being equal to −500 A. It can be seen from FIG. 5B that changing the threshold of the discharge current in the range of −200 A to −500 A does not influence the timings of occurrence of the local maximum values and local minimum values of the discharge current. Accordingly, there is a flexibility in setting the threshold of the discharge current for determining the timing of resetting the annealing process.

In the present embodiment, the battery ECU 60 functions as an engine rotational speed determining device to determine the rotational speed of the engine 10, more specifically, to determine the rotational speed of the crankshaft 12.

Figure 6:
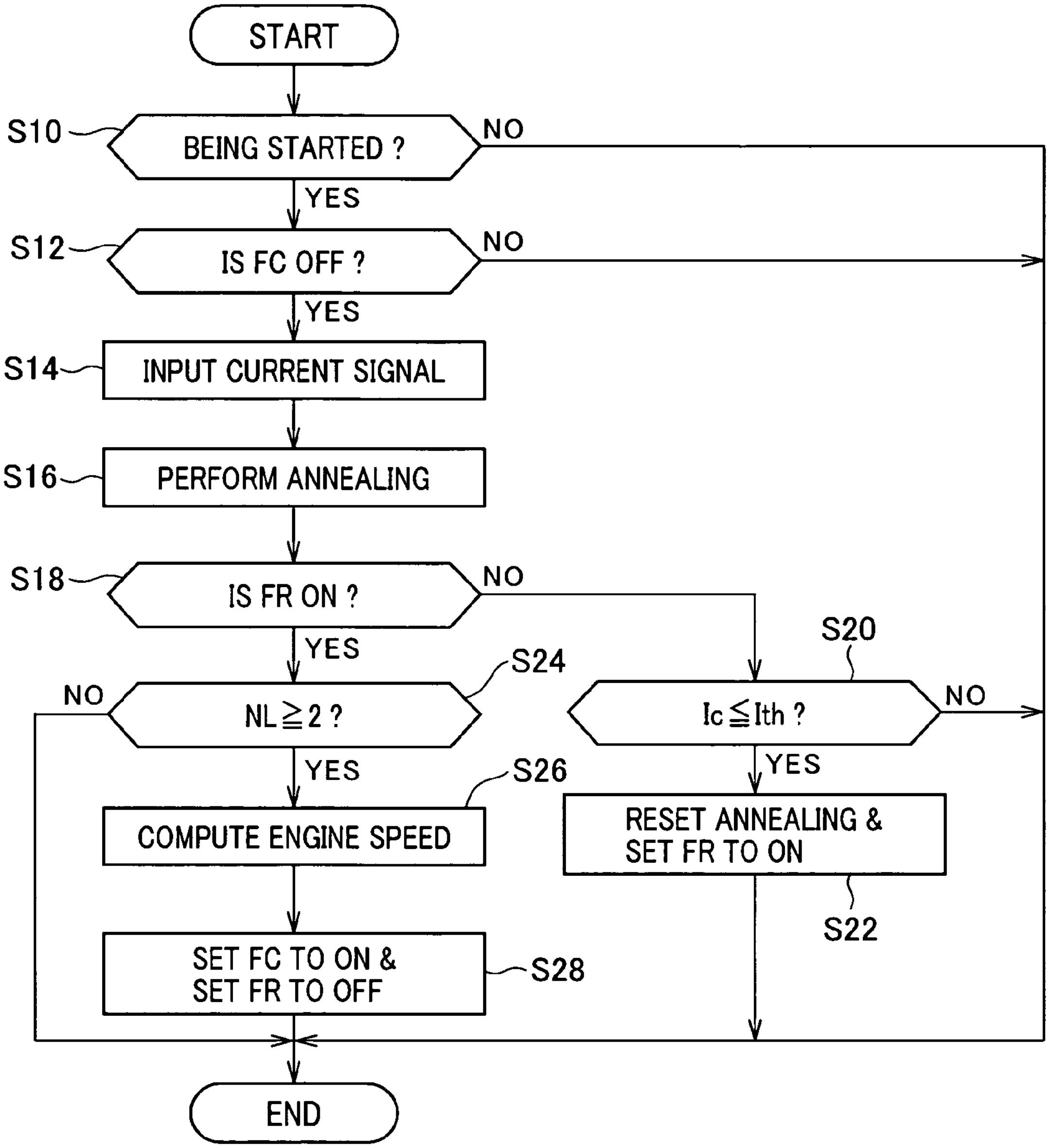
FIG. 6 is a flow chart illustrating a process of a battery ECU for determining the rotational speed of the engine in a starting operation of the engine.

FIG. 6 shows the process of the battery ECU 60 for determining the rotational speed of the crankshaft 12 during a starting operation of the engine 10. This process is repeated, for example, in a predetermined cycle.

First, in step S10, the battery ECU 60 determines whether the engine 10 is being started by the starter 40. More specifically, the battery ECU 60 determines whether a starter switch is turned on by the driver of the vehicle.

If the determination in step S10 results in a "NO" answer, then the process directly goes to the end. Otherwise, if the determination in step S10 results in a "YES" answer, then the process proceeds to step S12.

In step S12, the battery ECU 60 further determines whether a flag FC is in an OFF state. Here, the flag FC indicates whether the determination of the rotational speed of the crankshaft 12 has been completed.

If the determination in step S12 results in a "NO" answer, in other words, if the determination of the rotational speed of the crankshaft 12 has been completed, then the process directly goes to the end.

Otherwise, if the determination in step S12 results in a "YES" answer, in other words, if the determination of the rotational speed of the crankshaft 12 has not yet been completed, then the process proceeds to step S14.

In step S14, the battery ECU 60 inputs the signal output from the current sensor 52, which indicates the discharge current of the battery 30.

In step S16, the battery ECU 60 computes a current value Ic of the discharge current of battery 30 by performing the ⅛ annealing process for the signal output from the current sensor 52.

In step S18, the battery ECU 60 determines whether a flag FR is in an ON state. Here, the flag FR indicates whether the annealing process has been reset.

If the determination in step S18 results in a "NO" answer, in other words, if the annealing process has not yet been reset, then the process proceeds to step S20.

In step S20, the battery ECU 60 determines whether the current value Ic of the discharge current of the battery 30 is less than or equal to the threshold Ith of the discharge current.

If the determination in step S20 results in a "NO" answer, in other words, if the discharge current of the battery 30 has not sufficiently decreased from the initial rapid increase, then the process directly goes to the end.

Otherwise, if the determination in step S20 results in a "YES" answer, in other words, if the discharge current of the battery has sufficiently decreased from the initial rapid increase, then the process proceeds to step S22.

In step S22, the battery ECU 60 resets the annealing process, and then sets the flag FR to ON.

On the other hand, if the determination in step S18 results in a "YES" answer, in other words, if the annealing process has been reset, then the process proceeds to step S24.

In step S24, the battery ECU 60 determines whether the number NL of local maximum values of the discharge current having been computed is greater than or equal to 2.

If the determination in step S24 results in a "NO" answer, then the process directly goes to the end. Otherwise, if the determination in step S24 results in a "YES" answer, then the process proceeds to step S26.

In step S26, the battery ECU 60 computes the rotational speed of the crankshaft 12.

More specifically, when the number NL of the local maximum values of the discharge current is equal to 2, the battery ECU 60 computes the rotational speed of the starter 40 based on the time interval between the two local maximum values. Otherwise, when the number NL of the local maximum values of the discharge current is greater than 2, the battery ECU 60 first computes plural values of the rotational speed of the starter 40 based respectively on the time intervals between the local maximum values, and then computes the average of the plural values as the rotational speed of the starter 40. After that, the battery ECU 60 further computes the rotational speed of the crankshaft 12 by multiplying the computed rotational speed of the starter 40 by the gear ratio between the starter 40 and the crankshaft 12.

In step S28, the battery ECU 60 sets the flag FC to ON and the flag FR to OFF. Then, the process goes to the end.

In the present embodiment, the battery ECU 60 also functions as an engine starting possibility predicting device to predict the possibility of the starter 40 to successfully start the engine 10 in an upcoming starting operation of the engine 10.

Figure 7:
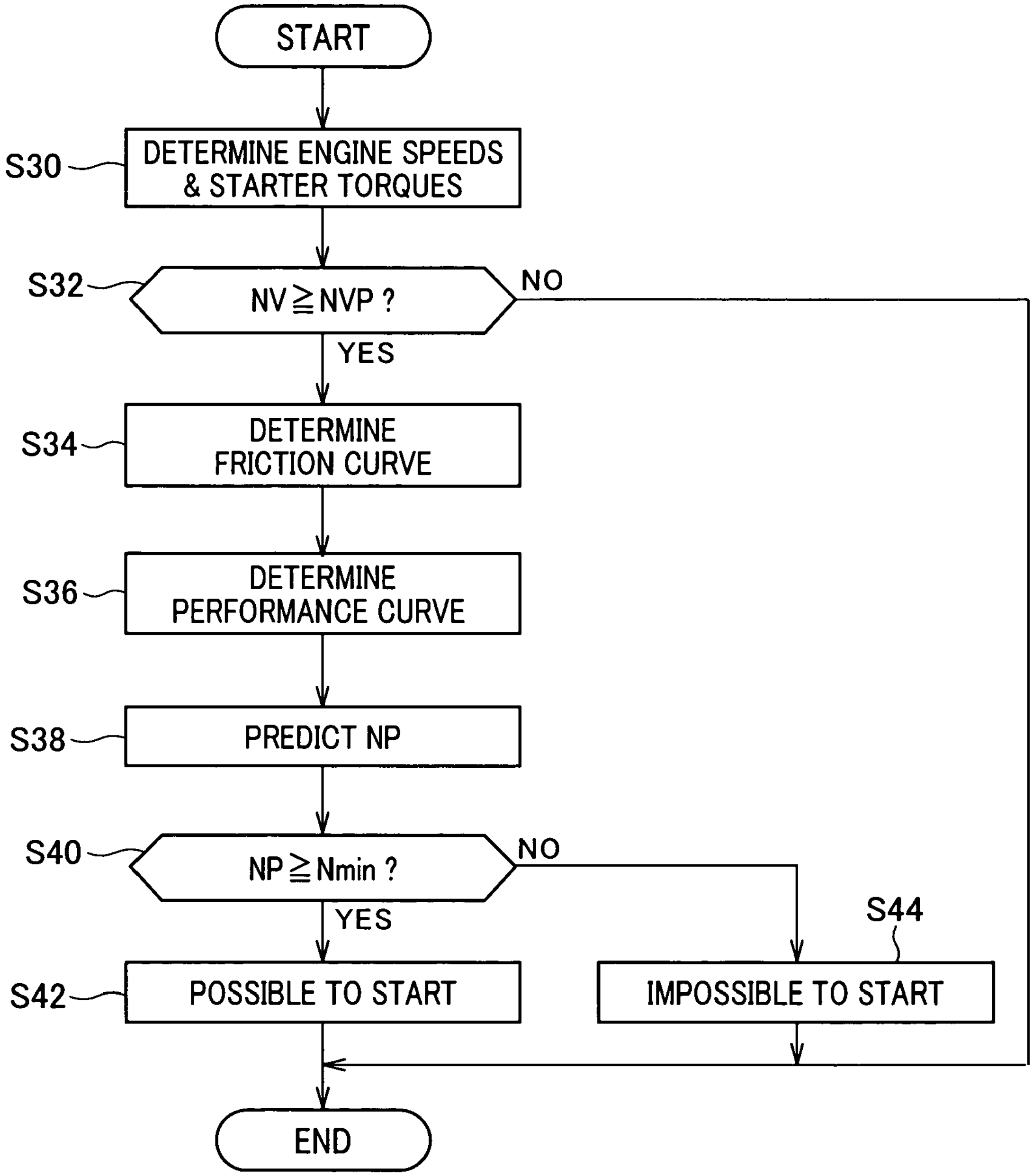
FIG. 7 is a flow chart illustrating a process of the battery ECU for determining the possibility of successfully starting the engine in an upcoming starting operation of the engine.

FIG. 7 shows the process of the battery ECU 60 for predicting the possibility of the starter 40 to successfully start the engine 10 in an upcoming starting operation of the engine 10. This process is repeated, for example, in a predetermined cycle.

In step S30, the battery ECU 60 determines, based on the signal output from the current sensor 52, both the rotational speed of the crankshaft 12 and the torque of the starter 40 during each of a plurality of starting operations of the engine 10.

Figure 8:
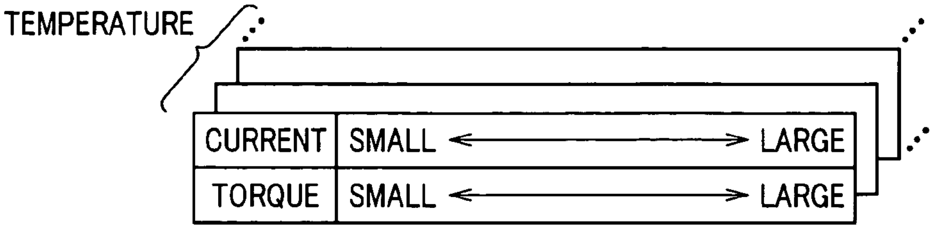
FIG. 8 is a map used by the battery ECU to determine the torque of a starter for starting the engine.

More specifically, during each of the starting operations of the engine 10, the battery ECU 60 determines the rotational speed of the crankshaft 12 by performing the process shown in FIG. 6. Further, the battery ECU 60 determines the torque of the starter 40 using a map as shown in FIG. 8. The torque of the starter 40 depends on both the temperature of the starter 40 and the current flowing through the starter 40. Therefore, the map may be prepared such that the temperature in the map represents the temperature of the starter 40 and the current in the map represents the current flowing through the starter 40. However, in the present embodiment, there are provided the current sensor 52 for sensing the charge/discharge current of the battery 30 and the temperature sensor 54 for sensing the temperature of the battery 30, but no dedicated current sensor for sensing the current flowing through the starter 40 and no dedicated temperature sensor for sensing the temperature of the starter 40. Further, the current flowing through the starter 40 depends on the discharge current of the battery 30, and the temperature of the starter 40 depends on the temperature of the battery 30. Therefore, the map is preferably prepared such that the temperature in the map represents the temperature of the battery 30 and the current in the map represents the discharge current of the battery 30.

In succeeding step S32, the battery ECU 60 determines whether the number NV of values of the rotational speed of the crankshaft 12 and the torque of the starter 40, which have been determined during the foregone starting operations of the engine 10 with the then temperatures of the battery 30 falling in the same region as the current temperature of the battery 30, is greater than or equal to a predetermined number NVP.

More specifically, the friction of the engine 10 can be estimated in the form of a friction curve which represents the relationship between the rotational speed of the crankshaft 12 and the torque of the starter 40. Further, the friction of the engine 10 changes with the temperature of the engine 10. In addition, before the start of combustion control of the engine 10, the temperature of the engine 10 is almost equal to the temperature of the battery 30. Therefore, to determine the friction curve for the current temperature, it is necessary for the number NV is so large as to be greater than the predetermined number NVP.

If the determination in step S32 results in a "NO" answer, then the process directly goes to the end. Otherwise, if the determination in step S32 results in a "YES" answer, then the process proceeds to step S34.

Figure 9:
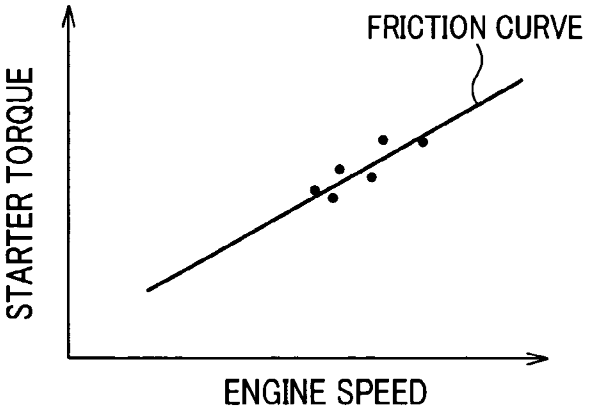
FIG. 9 is a graphical representation illustrating the determination of a friction curve by the battery ECU.

In step S34, the battery ECU 60 determines, based on the NV values of the rotational speed of the crankshaft 12 and the torque of the starter 40, the friction curve through a single linear regression analysis. The determined friction curve is, for example, as shown in FIG. 9. In FIG. 9, the friction curve is drawn on a two-dimensional coordinate plane where the horizontal coordinate axis indicates rotational speed of the crankshaft 12 and the vertical coordinate axis indicates torque of the starter 40.

Figure 10:
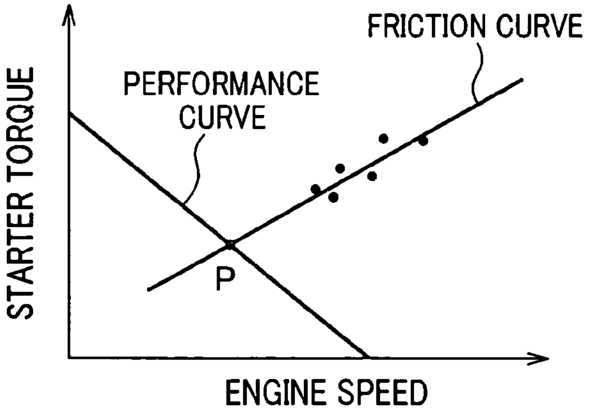
FIG. 10 is a graphical representation illustrating the determination of an intersection point between the friction curve and a performance curve of the starter by the battery ECU.

In step S36, the battery ECU 60 determines, based on the SOC of the battery 30, a performance curve of the starter 40 which represents the performance of the starter 40 at the SOC of the battery 30. The determined performance curve is, for example, as shown in FIG. 10. In FIG. 10, the performance curve is drawn, together with the friction curve, on the two-dimensional coordinate plane whose horizontal and vertical coordinate axes respectively represent rotational speed of the crankshaft 12 and torque of the starter 40.

The performance curve of the starter 40 is determined based on an equivalent circuit as shown in FIG. 11. In FIG. 11, Vo represents the open-circuit voltage of the battery 30; Vm represents the induced voltage of the starter 40 (i.e., the back electromotive force induced in the starter 40); Rb represents the internal resistance of the battery 30; Rs represents the internal resistance of the starter 40; and Rv represents the wiring resistance (i.e., the resistance of wires) between the battery 30 and the starter 40.

In the equivalent circuit, there is satisfied the following relationship:

$$Vo = I \times (Rb + Rv + Rs) + Vm \qquad \text{(Equation 1)}$$

where I is the current flowing through the circuit.

Further, the following equation can be derived by substituting (Vm=B×L×N) into Equation 1, where B, L, and N are respectively the magnetic flux density of the magnetic field in the starter 40, the length of wires traversing the magnetic field, and the rotational speed of the starter 40.

$$Vo = I \times (Rb + Rv + Rs) + B \times L \times N \qquad \text{(Equation 2)}$$

On the other hand, the torque T of the starter 40 can be represented by the following equation:

$$T = B \times L \times I \qquad \text{(Equation 3)}$$

By eliminating the current I in both Equations 2 and 3, the following equation can be derived.

$$T = (Vo - B \times L \times N) \times B \times L / (Rb + Rv + Rs) \qquad \text{(Equation 4)}$$

In the present embodiment, the performance curve of the starter 40 is determined based on the above Equation 4. More specifically, the sum of the wiring resistance Rv and the internal resistance Rs of the starter 40, which depends on temperature, is determined using a map as shown in FIG. 12A. Moreover, the internal resistance Rb of the battery 30, which depends on the SOC of the battery 30 as well as on temperature, is determined using a map as shown in FIG. 12B. Furthermore, the open-circuit voltage V0 of the battery 30 is determined based on the equation of (Vo=Vb−Rb×I−Vp), where Vp is the polarization voltage of the battery 30. The polarization voltage Vp, which depends on both temperature and the SOC of the battery 30, is determined using a map as shown in FIG. 13.

Returning to FIG. 7, in step S38 of the process, the battery ECU 60 determines, on the two-dimensional coordinate plane shown in FIG. 10, the intersection point P between the friction curve and the performance curve of the starter 40. Then, the battery ECU 60 predicts a value NP of the rotational speed of the crankshaft 12 as the value of the rotational speed at the intersection point P. More specifically, the battery ECU 60 predicts that the rotational speed of the crankshaft 12 will have the value NP in the upcoming starting operation of the engine 10 if the upcoming starting operation starts from the present moment.

In succeeding step S40, the battery ECU 60 determines whether the predicted value NP is greater than or equal to the lower limit Nmin of the rotational speed of the crankshaft 12. As described previously, to successfully start the engine 10, it is necessary for the rotational speed of the crankshaft 12 to be raised by the starter 40 above the lower limit Nmin.

If the determination in step S40 results in a "YES" answer, then the process proceeds to step S42.

In step S42, the battery ECU 60 predicts that it is possible for the starter 40 to successfully start the engine 10 in the upcoming starting operation of the engine 10. Then, the process goes to the end.

On the other hand, if the determination in step S40 results in a "NO" answer, then the process proceeds to step S44.

In step S44, the battery ECU 60 predicts that it is impossible for the starter 40 to successfully start the engine 10 in the upcoming starting operation of the engine 10. Then, the battery ECU 60 informs the driver of the vehicle, via a display 62 as shown in FIG. 1, of the impossibility of the starter 40 to successfully start the engine 10. After that, the process goes to the end.

According to the present embodiment, the following advantages can be obtained.

In the present embodiment, the battery ECU 60 functions as an engine rotational speed determining device to determine the rotational speed of the crankshaft 12 for a starting operation of the engine 10. More specifically, the battery ECU 60 inputs the signal output from the current sensor 52 during the starting operation of the engine 10; the signal indicates the discharge current of the battery 30, in other words, the current supplied from the battery 30 to the starter 40. Then, the battery ECU 60 determines the rotational speed of the crankshaft 12 in the starting operation based on the cyclic change in the discharge current of the battery 30 indicated by the signal input from the current sensor 52.

Generally, the discharge current of the battery 30 depends only slightly on the SOC of the battery 30, whereas the terminal voltage of the battery 30 depends heavily on the SOC of the battery 30. Therefore, according to the present embodiment, the battery ECU 60 can more accurately determine the rotational speed of the crankshaft 12 in the starting operation in comparison with the case of determining the same based on the cyclic change in the terminal voltage of the battery 30.

Further, in the present embodiment, the battery ECU 60 performs a relaxation process (or annealing process) for the signal input from the current sensor 52, thereby eliminating the influence of electrical noise on the accuracy of determination of the rotational speed of the crankshaft 12.

Furthermore, in the present embodiment, the battery ECU 60 resets the relaxation process at a timing when the discharge current of the battery 30 has decreased, after the initial rapid increase thereof, to become not higher than the threshold Ith of the discharge current. Consequently, it is possible for the battery ECU 60 to eliminate the influence of the initial rapid increase of the discharge current on the results of the relaxation process, thereby improving the accuracy of determination of the rotational speed of the crankshaft 12.

In addition, steps S14, S26, S16, and S22 of FIG. 6 respectively correspond to the signal inputting means, rotational speed determining means, relaxation process performing means, and relaxation process resetting means of the present invention.

In the present embodiment, the battery ECU 60 also functions as an engine starting possibility predicting device to predict the possibility of the starter 40 to successfully start the engine 10 in an upcoming starting operation of the engine 10. More specifically, the battery ECU 60 inputs the signal output from the current sensor 52 during each of a plurality of starting operations the engine 10. Then, the battery ECU 60 determines both the rotational speed of the crankshaft 12 and the torque of the starter 40 in each of the starting operations based on the change in the discharge current of the battery 30 indicated by the signal input from the current sensor 52. Thereafter, the battery ECU 60 predicts, based on those values of the rotational speed of the crankshaft 12 and the torque of the starter 40 which have been determined for the foregone starting operations with the then temperatures of the battery 30 falling in the same region as the current temperature of the battery 30, the possibility of the starter 40 to successfully start the engine 10 in the upcoming starting operation.

The friction of the engine 10, which counteracts the rotation of the crankshaft 12 with the starter 40, can be estimated based on both the rotational speed of the crankshaft 12 and the torque of the starter 40. Further, based on the friction of the engine, the battery ECU 60 can predict the possibility of the starter 40 to successfully start the engine 10 in the upcoming starting operation. Furthermore, since both the rotational speed of the crankshaft 12 and the torque of the starter 40 are determined based on the same parameter, i.e., the discharge current of the battery 30, the battery ECU 60 can make the predication easily and accurately.

Moreover, in the present embodiment, the battery ECU 60 predicts the rotational speed Np of the crankshaft 12 in the upcoming starting operation based on those values of the rotational speed of the crankshaft 12 and the torque of the starter 40 as described above. When the predicted rotational speed Np of the crankshaft 12 is greater than or equal to the lower limit Nmin, the battery ECU 60 predicts that it is possible for the starter 40 to successfully start the engine in the upcoming starting operation.

With the above configuration, the battery ECU 60 can easily and accurately predict the possibility of the starter 40 to successfully start the engine 10 in the upcoming starting operation.

Furthermore, in the present embodiment, the battery ECU 60 determines, on the two-dimensional coordinate plane as shown in FIG. 10, the friction curve based on those values of the rotational speed of the crankshaft 12 and the torque of the starter 40 as described. The battery ECU 60 also determines, on the two-dimensional coordinate plane, the performance curve of the starter 40 based on the SOC of the battery 30. Then, the battery ECU 60 predicts the rotational speed Np of the crankshaft 12 in the upcoming starting operation as the rotational speed of the crankshaft 12 at the intersection point P between the friction curve and the performance curve of the starter 40.

The friction curve represents the friction of the engine 10, whereas the performance curve represents the performance of the starter 40 at the SOC of the battery 30. Therefore, with the above configuration, the battery ECU 60 can easily and accurately predict the rotational speed of the crankshaft 12 in the upcoming starting operation.

In addition, step S30 of FIG. 7 corresponds to the rotational speed determining means and torque determining means, steps S32, S34, S36, and S38 of FIG. 6 together correspond to the rotational speed predicting means, and steps S40, S42, and S44 together correspond to the possibility predicting means of the present invention.

Second Embodiment

In the previous embodiment, the engine ECU 50 performs the engine automatic start control to automatically start the engine 10 from a stop by using the starter 40.

In comparison, in the present embodiment, the engine ECU 50 performs an engine automatic start control to automatically start the engine 10 from a stop through combustion control of the engine 10 without using the starter 40. In this case, it is essential to accurately control the stop position of the crankshaft 12 in the last automatic stop of the engine 10.

In controlling the stop position of the crankshaft 12, the manipulation of actuators, such as a throttle valve and a fuel injector, is limited. Moreover, the amount of electric power generated by the electric power generation unit 20 is also limited. Therefore, it is necessary to accurately adjust the amounts of manipulation of the actuators and the amount of electric power generated by the electric power generation unit 20, so as to bring the stop position of the crankshaft 12 to a desired position. However, the adjustment of the amounts of manipulation of the actuators and the amount of electric power generated by the electric power generation unit 20 is also dependent on the friction of the engine 10 which changes with the aging deterioration of the engine 10. Therefore, it is necessary to accurately estimate the present level of the friction of the engine 10 for ensuring the accuracy of the engine automatic stop control.

In the present embodiment, the battery ECU 60 also functions as an engine friction estimating device to estimate the friction of the engine 10.

Figure 14:
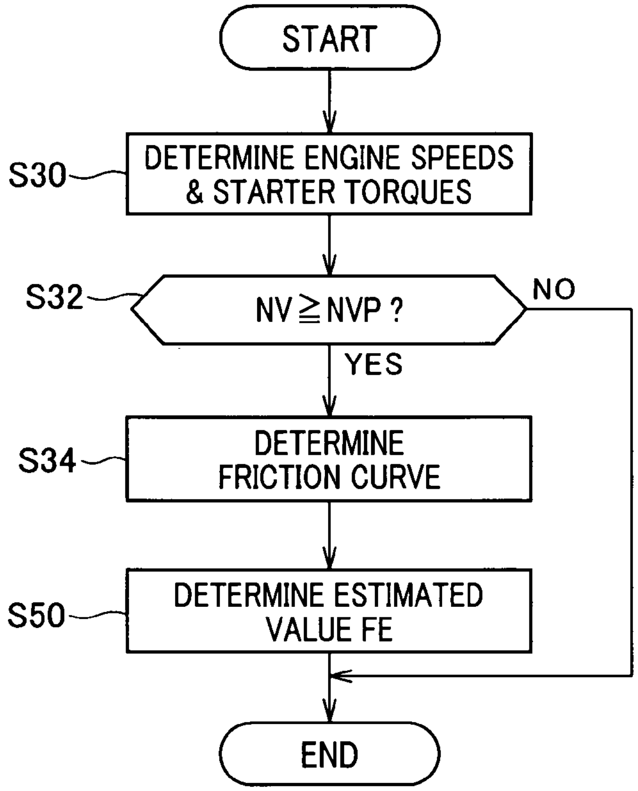
FIG. 14 is a flow chart illustrating a process of the battery ECU for estimating friction of the engine.

FIG. 14 shows the process of the battery ECU 60 for estimating the friction of the engine 10. This process is repeated, for example, in a predetermined cycle.

Steps S30, S32, and S34 of the process are respectively the same as those of the process shown in FIG. 7; therefore, a repeated description thereof is omitted hereinafter.

In step S50, the battery ECU 60 determines an estimated value FE of the friction of the engine 10 as the torque of the starter 40 at the point on the friction curve where the rotational speed of the crankshaft 12 is equal to a predetermined value Nx. Then, the process goes to the end.

The estimated value Fe represents the present level of the friction of the engine 10. This is because the higher the friction of the engine 10 is, the higher the torque of the starter 40 is at the same rotational speed of the crankshaft 12.

Moreover, based on the estimated value FE of the friction of the engine 10, the engine ECU 50 performs the engine automatic stop control.

Figure 15:
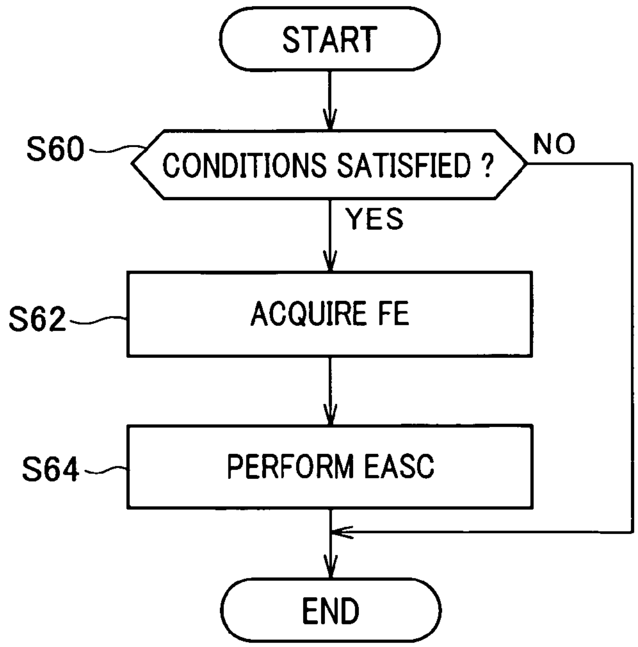
FIG. 15 is a flow chart illustrating a process of an engine ECU for performing an engine automatic stop control.

FIG. 15 shows the process of the engine ECU 50 for performing the engine automatic stop control. This process is performed, for example, in a predetermined cycle.

First, in step S60, the engine ECU 50 determines whether conditions for automatically stopping the engine 10 are satisfied. Here, the conditions may be set to well-known conditions for performing an idle reduction control.

If the determination in step S60 results in a "NO" answer, then the process directly goes to the end. Otherwise, if the determination in step S60 results in a "YES" answer, then the process proceeds to step S62.

In step S62, the engine ECU 50 acquires the estimated value FE of the friction of the engine 10 from the battery ECU 60.

In succeeding step S64, the engine ECU 50 performs the engine automatic stop control (abbreviated to EASC in FIG. 15) based on the estimated value FE of the friction of the engine 10.

More specifically, the engine ECU 50 sets, based on the estimated value FE of the friction of the engine 10, the amounts of manipulation of the actuators and the amount of electric power generated by the electric power generation unit 20. Then, the engine ECU 50 manipulates the actuators by the set amounts of manipulation and controls the electric power generation unit 20 to generate the set amount of electric power, thereby bringing the stop position of the crankshaft 12 to the desired position. With respect to more details about control of the stop position of the crankshaft 12, a reference can be made to, for example, Japanese Patent First Publication No. 2005-315202.

After step S64, the process goes to the end.

According to the present embodiment, the following advantages can be further obtained.

In the present embodiment, the battery ECU 60 also functions as an engine friction estimating device to estimate the friction of the engine 10. More specifically, the battery ECU 60 inputs the signal output from the current sensor 52 during each of a plurality of starting operations the engine 10. Then, the battery ECU 60 determines both the rotational speed of the crankshaft 12 and the torque of the starter 40 in each of the starting operations based on the change in the discharge current of the battery 30 indicated by the signal input from the current sensor 52. Thereafter, the battery ECU 60 estimates the friction of the engine 10 based on those values of the rotational speed of the crankshaft 12 and the torque of the starter 40 which have been determined for the foregone starting operations with the then temperatures of the battery 30 falling in the same region as the current temperature of the battery 30.

The friction of the engine 10, which counteracts the rotation of the crankshaft 12 with the starter 40, can be estimated based on both the rotational speed of the crankshaft 12 and the torque of the starter 40. In the present embodiment, since both the rotational speed of the crankshaft 12 and the torque of the starter 40 are determined based on the same parameter, i.e., the discharge current of the battery 30, it is possible for the battery ECU 60 to easily and accurately estimate the friction of the engine 10.

Further, in the present embodiment, the battery ECU 60 estimates the friction of the engine 10 in the form of the estimated value FE of the friction. More specifically, the battery ECU 60 determines, on the two-dimensional coordinate plane as shown in FIG. 10, the friction curve based on those values of the rotational speed of the crankshaft 12 and the torque of the starter 40 as described above. Then, the battery ECU 60 determines the estimated value FE as the torque of the starter 40 at the point on the friction curve where the rotational speed of the crankshaft 12 is equal to the predetermined value Nx.

With the above configuration, the battery ECU 60 can more easily and accurately estimate the friction of the engine 10.

In addition, step S50 of FIG. 14 corresponds to the engine friction estimating means of the present invention.

In the present embodiment, the engine ECU 50 and the battery ECU 60 together function as an engine automatic stop control device to control an automatic stop of the engine 10. More specifically, when the conditions for automatically stopping the engine 10 are satisfied, the engine ECU 50 acquires the estimated value FE of the friction of the engine 10 from the battery ECU 60. Then, the engine ECU 50 controls the automatic stop of the engine 10 based on the estimated value FE of the friction of the engine 10.

With the above configuration, the engine ECU 50 can suitably control the automatic stop of the engine 10 regardless of change in the friction of the engine 10.

In addition, steps S60 and S64 of FIG. 15 together correspond to the controlling means of the present invention.

Third Embodiment

In this embodiment, the battery ECU 60 is further configured to inform, when there is a considerable increase in the friction of the engine 10, the driver of the vehicle of the increase in the friction.

Figure 16:
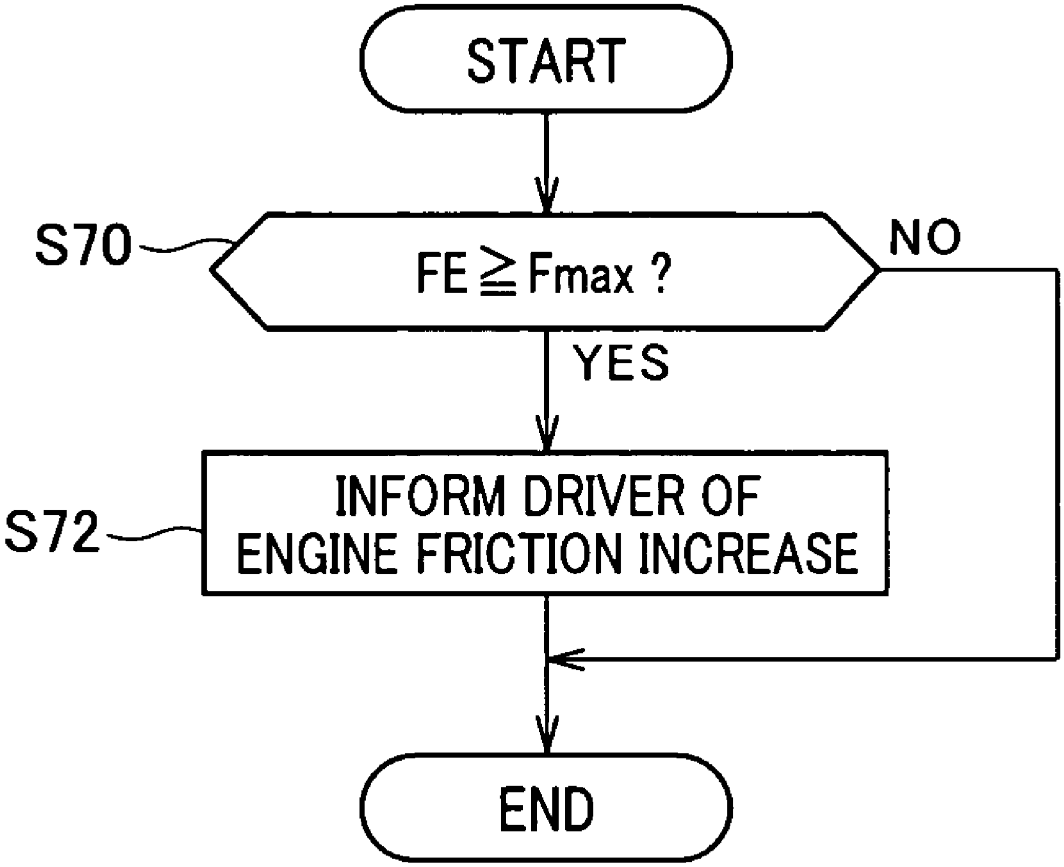
FIG. 16 is a flow chart illustrating a process of the battery ECU for informing an increase in the friction of the engine.

FIG. 16 shows the process of the battery ECU 60 for informing an increase in the friction of the engine 10. This process is repeated, for example, in a predetermined cycle.

First, in step S70, the battery ECU 60 determines whether the evaluated value FE of the friction of the engine 10 is greater than or equal to a threshold value Fmax. Here, the threshold value Fmax represents the upper limit of the friction above which the engine 10 cannot properly operate.

If the determination in step S70 results in a "NO" answer, then the process directly goes to the end. Otherwise, if the determination in step S70 results in a "YES" answer, then the process proceeds to step S70.

In step S70, the battery ECU 60 informs the driver of the vehicle, via the display 62 as shown in FIG. 1, of the increase in the friction above the upper limit. Then, the process goes to the end.

According to the present embodiment, the following advantages can be further obtained.

In the present embodiment, the battery ECU 60 determines whether the friction of the engine 10 has increased to exceed the upper limit by determining whether the evaluated value FE of the friction is greater than or equal to the threshold value Fmax.

With this configuration, the battery ECU 60 can easily and correctly make the determination of whether the friction of the engine 10 has increased to exceed the upper limit.

In addition, by informing the driver of the increase in the friction of the engine 10, it is possible to allow the driver to take necessary measures, such as changing the engine oil, in a timely manner.

While the above particular embodiments of the invention have been shown and described, it will be understood by those skilled in the art that various modifications, changes, and improvements may be made without departing from the spirit of the invention.

1) In the first embodiment, the battery ECU 60 determines the rotational speed of the crankshaft 12 based on the time interval (or time intervals) between local maximum values of the discharge current of the battery 30.

However, it is also possible for the battery ECU 60 to compute the rotational speed of the crankshaft 12 based on the time interval (or time intervals) between local minimum values of the discharge current.

2) In the first embodiment, the battery ECU 60 performs the ⅛ annealing process for the signal output from the current sensor 52.

However, the battery ECU 60 may also perform, instead of the ⅛ annealing process, any other annealing process whose weighting factors are suitably set according to the design specifications of the engine 10 and the starter 40.

Further, the relaxation process for eliminating the influence of electrical noise is not limited to an annealing process. For example, the battery ECU 60 may also perform, instead of the ⅛ annealing process, a moving average process for the signal output from the current sensor 52.

Furthermore, the relaxation process is not limited to a digital filtering process. For example, the battery ECU 60 may also perform the relaxation process using a RC filter. In this case, it is also preferable to reset the relaxation process to eliminate the influence of the initial rapid increase in the discharge current of battery 30 on the results of the relaxation process.

3) In the first embodiment, the battery ECU 60 determines the torque of the starter 40 based on both the temperature of the battery 30 and the discharge current of the battery 30.

However, the battery ECU 60 may simply determine the torque of the starter 40 based only on the discharge current of the battery 30.

4) In the first embodiment, the battery ECU 60 determines the open-circuit voltage V0 of the battery 30 based on the equation of $(Vo=Vb-Rb\times I-Vp)$.

However, it is also possible for the battery ECU 60 to determine the open-circuit voltage V0 of the battery 30 using a predetermined map that represents the relationship between the open-circuit voltage V0 of the battery 30, the SOC of the battery 30, and the temperature of the battery 30.

5) In the first embodiment, the battery ECU 60 predicts the engine starting possibility by determining whether the predicted value NP of the rotational speed of the crankshaft 12 is greater than or equal to the lower limit Nmin.

However, it is also possible for the battery ECU 60 to predict the engine starting possibility by determining whether the estimated value FE of the friction of the engine 10 is greater than or equal to a predetermined value.

6) In the second embodiment, the battery ECU 60 estimates the friction of the engine 10 in the form of the estimated value FE.

However, the battery ECU 60 may also estimate the friction of the engine 10 in the form of an estimated value NE which is the rotational speed of the crankshaft 12 at the point on the friction curve where the torque of the starter 40 is equal to a predetermined value.

Further, it is also possible for the battery ECU 60 to estimate the friction of the engine 10 using, instead of the friction curve, a predetermined map that represents the relationship between the friction of the engine 10, the rotational speed of the crankshaft 12, and the torque of the starter 40.

7) In the previous embodiments, the battery ECU 60 determines the rotational speed of the crankshaft 12 and the torque of the starter 40 based on the discharge current of the battery 30.

However, an additional current sensor may be further employed to sense current flowing through the starter 40, so that the battery ECU 60 can determine the rotational speed of the crankshaft 12 and the torque of the starter 40 based on the current flowing through the starter 40.

8) In the first embodiment, the battery ECU 60 resets the annealing process in the determination of the rotational speed of the crankshaft 12.

However, the battery ECU 60 may simply determine the rotational speed of the crankshaft 12 without resetting the annealing process.

9) In the first embodiment, the engine 10 is started by the starter 40.

However, in addition to the starter 40, a motor-generator may be further employed to start the engine 10 in a restarting operation of the engine 10 after an automatic stop of the engine 10.

10) In the first embodiment, the battery 30 is made up of a lead accumulator.

However, the battery 30 may be alternatively made up of, for example, a nickel metal-hydride battery pack.

11) In the previous embodiments, the engine 10 is a port-injection gasoline engine.

However, the engine 10 may be alternatively a cylinder-injection gasoline engine. Further, the engine 10 is not limited to a gasoline engine. For example, the engine 10 may be a diesel engine.

What is claimed is:

1. An engine rotational speed determining device comprising:
- a signal inputting means for inputting a signal that indicates current supplied to an electric motor, which starts an internal combustion engine, during a starting operation of the engine by the motor; and
- a rotational speed determining means for determining a rotational speed of the engine in the starting operation based on a change in the current indicated by the signal input by the signal inputting means;

a relaxation process performing means for performing a relaxation process for the signal input by the inputting means to eliminate the influence of electrical noise included in the signal; and a relaxation process resetting means for resetting the relaxation process at a timing when the current indicated by the signal has decreased, after an initial rapid increase thereof, to become not higher than a predetermined threshold, wherein the rotational speed determining means determines the rotational speed of the engine based on the signal that has received the relaxation process which is performed by the relaxation process performing means and reset by the relaxation process resetting means.

2. An engine starting possibility predicting device comprising:

a signal inputting means for inputting a signal that indicates current supplied to an electric motor, which starts an internal combustion engine, during each of a plurality of starting operations of the engine by the motor;

a rotational speed determining means for determining a rotational speed of the engine in each of the starting operations based on a change in the current indicated by the signal input by the signal inputting means;

a torque determining means for determining a torque of the motor in each of the starting operations based on the change in the current indicated by the signal input by the signal inputting means; and a possibility predicting means for predicting, based on the rotational speeds of the engine and the torques of the motor determined by the rotational speed determining means and the torque determining means, a possibility of the motor to successfully start the engine in an upcoming starting operation of the engine.

3. The engine starting possibility predicting device as set forth in claim 2, further comprising a rotational speed predicting means for predicting a rotational speed of the engine in the upcoming starting operation based on the rotational speeds of the engine and the torques of the motor determined by the rotational speed determining means and the torque determining means, wherein when the rotational speed of the engine in the upcoming starting operation predicated by the rotational speed predicting means is greater than or equal to a predetermined value, the possibility predicting means predicts that it is possible for the motor to successfully start the engine in the upcoming starting operation.

4. The engine starting possibility predicting device as set forth in claim 3, wherein the motor is powered by a battery, and wherein the rotational speed predicting means predicts the rotational speed of the engine in the upcoming starting operation in by being configured to:

define a two-dimensional coordinate plane, where one coordinate axis indicates rotational speed of the engine and the other coordinate axis indicates torque of the motor;

determine, on the two-dimensional coordinate plane, a friction curve based on the rotational speeds of the engine and the torques of the motor determined by the rotational speed determining means and the torque determining means, the friction curve representing friction of the engine;

determine, on the two-dimensional coordinate plane, a performance curve of the motor based on a State of Charge (SOC) of the battery, the performance curve representing the performance of the motor at the SOC of the battery; and predict the rotational speed of the engine in the upcoming starting operation as the rotational speed of the engine at an intersection point between the friction curve and the performance curve of the motor.

5. An engine friction estimating device comprising:

a signal inputting means for inputting a signal that indicates current supplied to an electric motor, which starts an internal combustion engine, during each of a plurality of starting operations of the engine by the motor;

a rotational speed determining means for determining a rotational speed of the engine in each of the starting operations based on a change in the current indicated by the signal input by the signal inputting means;

a torque determining means for determining a torque of the motor in each of the starting operations based on the change in the current indicated by the signal input by the signal inputting means; and an engine friction estimating means for estimating friction of the engine based on the rotational speeds of the engine and the torques of the motor determined by the rotational speed determining means and the torque determining means.

6. The engine friction estimating device as set forth in claim 5, wherein the engine friction estimating means estimates the friction of the engine in the form of an estimated value of the friction.

7. The engine friction estimating device as set forth in claim 6, wherein the engine friction estimating means determines the estimated value of the friction by being configured to:

define a two-dimensional coordinate plane, where one coordinate axis indicates rotational speed of the engine and the other coordinate axis indicates torque of the motor;

determine, on the two-dimensional coordinate plane, a friction curve based on the rotational speeds of the engine and the torques of the motor determined by the rotational speed determining means and the torque determining means, the friction curve representing the friction of the engine; and determine the estimated value of the friction as the torque of the motor at the point on the friction curve where the rotational speed of the engine is equal to a predetermined value.

8. An engine automatic stop control device comprising:

a signal inputting means for inputting a signal that indicates current supplied to an electric motor, which starts an internal combustion engine, during each of a plurality of starting operations of the engine by the motor;

a rotational speed determining means for determining a rotational speed of the engine in each of the starting operations based on a change in the current indicated by the signal input by the signal inputting means;

a torque determining means for determining a torque of the motor in each of the starting operations based on the change in the current indicated by the signal input by the signal inputting means;

an engine friction estimating means for estimating friction of the engine based on the rotational speeds of the engine and the torques of the motor determined by the rotational speed determining means and the torque determining means; and a controlling means for controlling an automatic stop of the engine based on the friction of the engine estimated by the engine friction estimating means.

9. A method of determining engine rotational speed, the method comprising:

receiving an input signal that indicates current supplied to an electric motor, which starts an internal combustion engine, during a starting operation of the engine by the motor; and determining a rotational speed of the engine in the starting operation based on a change in the current;

performing a relaxation process for the input signal to eliminate the influence of electrical noise included in the signal; and resetting the relaxation process at a timing when the current indicated by the signal has decreased, after an initial rapid increase thereof, to become not higher than a predetermined threshold, wherein said determining the rotational speed of the engine is based on the signal that has received the relaxation process which is performed by said performing and reset by said resetting.

10. A method of predicting an engine starting possibility, the method comprising:

receiving an input signal that indicates current supplied to an electric motor, which starts an internal combustion engine, during each of a plurality of starting operations of the engine by the motor;

determining a rotational speed of the engine in each of the starting operations based on a change in the current indicated by the input signal input;

determining a torque of the motor in each of the starting operations based on the change in the current; and predicting, based on the determined rotational speeds of the engine and the determined torques of the motor, a possibility of the motor to successfully start the engine in an upcoming starting operation of the engine.

11. The method as set forth in claim 10, further comprising;

predicting a rotational speed of the engine in the upcoming starting operation based on the determined rotational speeds of the engine and the determined torques of the motor, wherein when the rotational speed of the engine in the upcoming starting operation predicted by said predicting is greater than or equal to a predetermined value, a prediction is made that it is possible for the motor to successfully start the engine in the upcoming starting operation.

12. The method as set forth in claim 11, wherein the motor is powered by a battery, and wherein the rotational speed of the engine is predicted in the upcoming starting operation by:

defining a two-dimensional coordinate plane, where one coordinate axis indicates rotational speed of the engine and the other coordinate axis indicates torque of the motor;

determining, on the two-dimensional coordinate plane, a friction curve based on the determined rotational speeds of the engine and the determined torques of the motor, the friction curve representing friction of the engine;

determining, on the two-dimensional coordinate plane, a performance curve of the motor based on a State of Charge (SOC) of the battery, the performance curve representing the performance of the motor at the SOC of the battery; and predicting the rotational speed of the engine in the upcoming starting operation as the rotational speed of the engine at an intersection point between the friction curve and the performance curve of the motor.

13. A method comprising:

receiving an input signal that indicates current supplied to an electric motor, which starts an internal combustion engine, during each of a plurality of starting operations of the engine by the motor;

determining a rotational speed of the engine in each of the starting operations based on a change in the indicated current;

determining a torque of the motor in each of the starting operations based on the change in the indicated current; and estimating friction of the engine based on the determined rotational speeds of the engine and the determined torques of the motor.

14. The method as set forth in claim 13, wherein the friction of the engine is estimated in the form of an estimated value of the friction.

15. The method as set forth in claim 14, wherein the estimated value of the friction is determined by:

defining a two-dimensional coordinate plane, where one coordinate axis indicates rotational speed of the engine and the other coordinate axis indicates torque of the motor;

determining, on the two-dimensional coordinate plane, a friction curve based on the determined rotational speeds of the engine and the determined torques of the motor, the friction curve representing the friction of the engine; and determining the estimated value of the friction as the torque of the motor at the point on the friction curve where the rotational speed of the engine is equal to a predetermined value.

16. The method as set forth in claim 13 further comprising:

controlling an automatic stop of the engine based on the estimated friction of the engine.

* * * * *